US005506491A

United States Patent [19]
Ford

[11] Patent Number: 5,506,491
[45] Date of Patent: Apr. 9, 1996

[54] ELECTROSTATIC GENERATOR APPARATUS

[76] Inventor: Robert E. Ford, P.O. Box 198, Enfield, N.H. 03748

[21] Appl. No.: 205,085

[22] Filed: Mar. 3, 1994

[51] Int. Cl.⁶ .................................................. H02N 1/00
[52] U.S. Cl. .......................................... 322/2 A; 310/309
[58] Field of Search ........................... 322/2 A; 310/309; 361/230

[56] References Cited

U.S. PATENT DOCUMENTS

| | | |
|---|---|---|
| 93,563 | 8/1869 | Smith . |
| 560,852 | 5/1896 | Hollopeter . |
| 827,497 | 7/1906 | Baysdorfer . |
| 2,194,839 | 3/1940 | Van de Graaff et al. ................ 171/329 |
| 2,671,177 | 3/1954 | Robinson et al. ........................... 310/6 |
| 2,702,353 | 2/1955 | Herson et al. ................................. 310/6 |
| 3,324,315 | 3/1964 | Morel ............................................ 310/6 |
| 3,802,625 | 4/1974 | Buser et al. ................................ 239/15 |
| 3,821,603 | 6/1974 | De La Cierva .......................... 317/2 D |
| 4,385,340 | 5/1983 | Kuroshima ............................... 361/228 |
| 4,574,274 | 3/1986 | Pinneo ..................................... 340/572 |
| 4,595,852 | 6/1986 | Gundlach ................................ 310/309 |
| 4,897,592 | 1/1990 | Hyde ...................................... 322/2 A |

Primary Examiner—Thomas M. Dougherty
Assistant Examiner—Nicholas Ponomarenko

[57] ABSTRACT

An electrostatic generator for frictionally producing static electricity includes a flexible conductor hose arranged for communication therewith to permit static electricity directed through the conductor hose to be utilized for attracting objects thereto. The device includes a connector hose head operable to regulate the attractive force generated upon the object.

14 Claims, 5 Drawing Sheets

ELECTROSTATIC GENERATOR APPARATUS

BACKGROUND OF THE INVENTION

1. Field of the Invention

The field of invention relates to electrostatic generator apparatus, and more particularly pertains to a new electrostatic generator apparatus wherein the same is directed to the conducting and selective projection of electrostatic current from a head portion of a flexible conductor hose.

2. Description of the Prior Art

Electrostatic generator apparatus of various types are utilized throughout the prior art and are exemplified in the U.S. Pat. Nos. 4,595,852 and 4,897,592. The instant invention attempts to overcome deficiencies of the prior art by providing for an electrostatic generator having a flexible hose associated therewith to direct electrostatic energy therefrom and in this respect, the present invention substantially fulfills this need.

SUMMARY OF THE INVENTION

In view of the disadvantages inherent in the known types of electrostatic generator apparatus now present in the prior art, the present invention provides an electrostatic generator apparatus wherein the same is arranged to direct electrostatic energy from a head portion of a flexible hose to effect attraction of objects thereto by directing such static electricity at such objects. As such, the general purpose of the present invention, which will be described subsequently in greater detail, is to provide a new electrostatic generator apparatus and method which has many of the advantages of the prior art listed heretofore and many novel features that result in a electrostatic generator apparatus which is not anticipated, rendered obvious, suggested, or even implied by any of the prior art, either alone or in any combination thereof.

To attain this, the present invention provides an electrostatic generator for frictionally producing static electricity which includes a flexible conductor hose arranged for communication therewith to permit static electricity directed through the conductor hose to be utilized for attracting objects thereto. The device includes a connector hose head operable to regulate the attractive force generated upon the object.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new electrostatic generator apparatus and method which has many of the advantages of the prior art listed heretofore and many novel features that result in a electrostatic generator apparatus which is not anticipated, rendered obvious, suggested, or even implied by any of the prior art, either alone or in any combination thereof.

It is another object of the present invention to provide a new electrostatic generator apparatus which may be easily and efficiently manufactured and marketed.

It is a further object of the present invention to provide a new electrostatic generator apparatus which is of a durable and reliable construction.

An even further object of the present Invention is to provide a new electrostatic generator apparatus which is susceptible of a low cost of manufacture with regard to both materials and labor, and which accordingly is then susceptible of low prices of sale to the consuming public, thereby making such electrostatic generator apparatus economically available to the buying public.

Still yet another object of the present invention is to provide a new electrostatic generator apparatus which provides in the apparatuses and methods of the prior art some of the advantages thereof, while simultaneously overcoming some of the disadvantages normally associated therewith.

Even still yet another object of the present invention is to provide a new electrostatic generator apparatus which utilizes an electrostatic generator for frictionally producing static electricity including a flexible conductor hose arranged for communication therewith to permit static electricity directed through the conductor hose to be utilized for attracting objects thereto.

Yet still another object of the present invention is to provide a new and improved electrostatic generator apparatus including a flexible conductor hose arranged for communication therewith to permit static electricity directed through the conductor hose to be utilized for attracting objects thereto and which further includes a connector hose head operable to regulate the attractive force generated upon the object.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
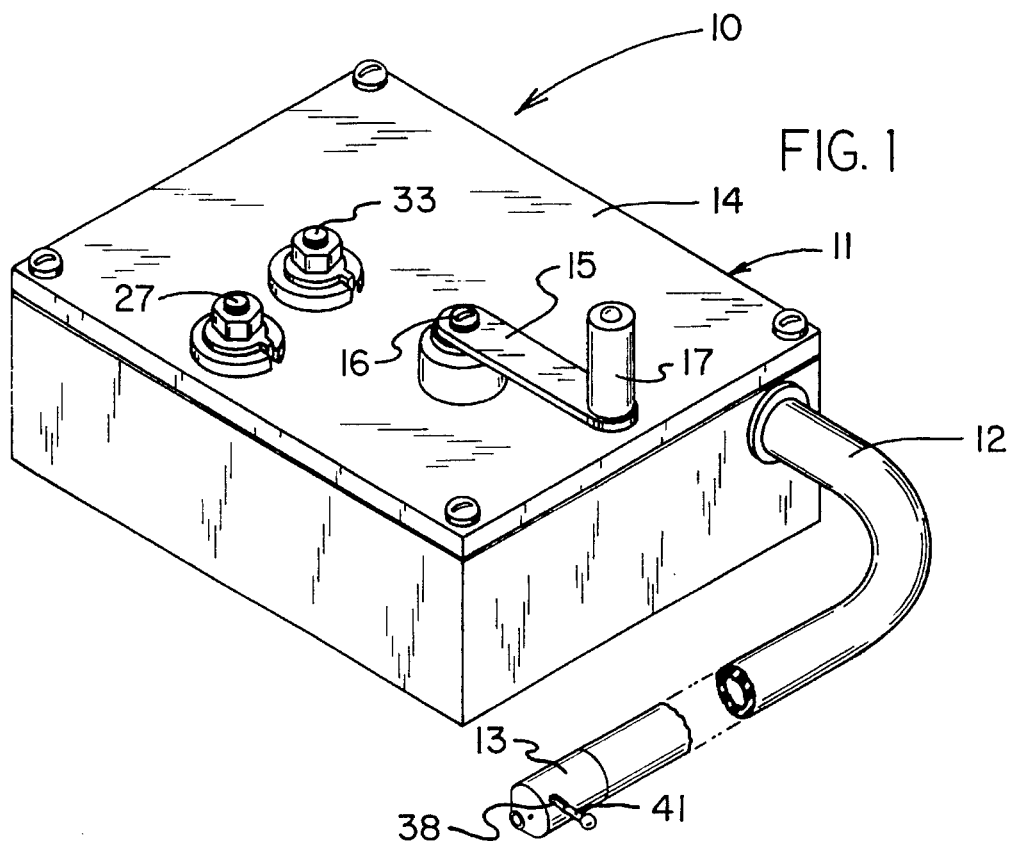
FIG. 1 is an isometric illustration of the invention.

With reference now to the drawings, and in particular to FIGS. 1 to 8 thereof, a new electrostatic generator apparatus embodying the principles and concepts of the present invention and generally designated by the reference numeral 10 will be described.

Figure 2:
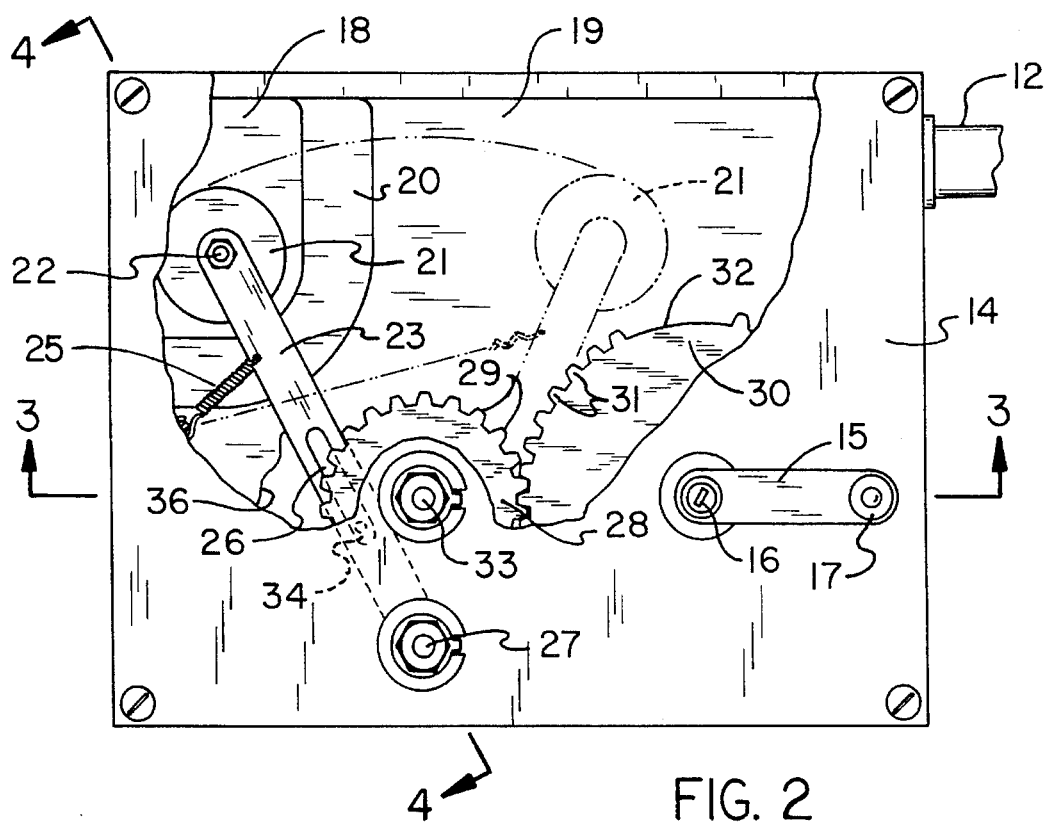
FIG. 2 is an orthographic view, partially cut away, of the housing structure as shown in FIG. 1.
Figure 3:
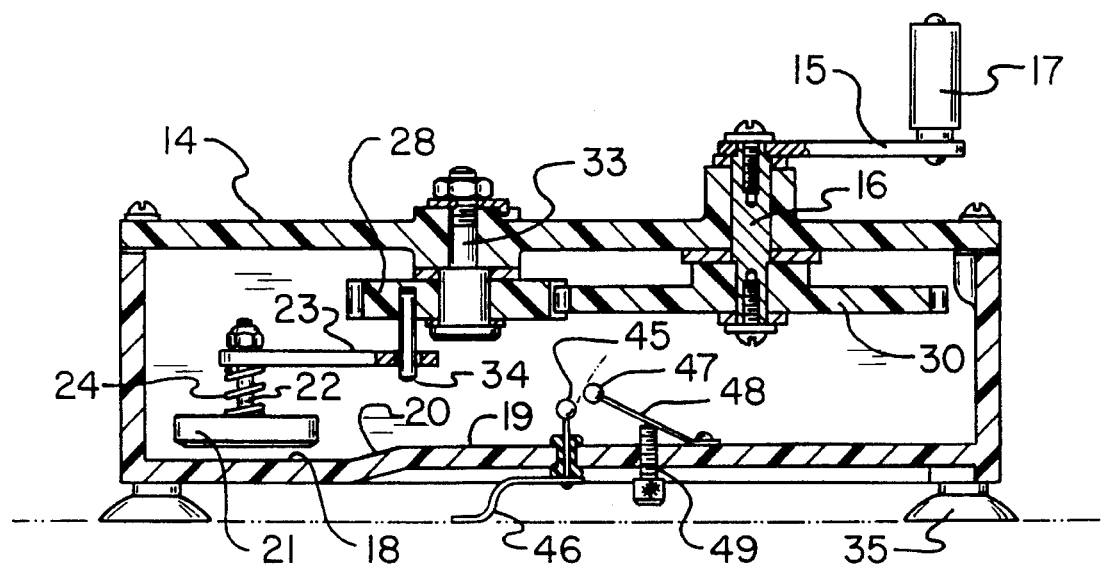
FIG. 3 is a cross sectional view, taken along the lines 3–3 of FIG. 2 in the direction indicated by the arrows.

More specifically, the electrostatic generator apparatus 10 of the instant invention comprises a housing 11 having a rigid polymeric construction, such as formed from the trademarked product "PLEXIGLASS" or the like. As best illustrated in FIGS. 1–3, the housing includes a housing top wall 14 with a crank formed of a crank handle plate 15 rotatably mounted about a handle axle 16 directed orthogonally through the housing top wall 14. A handle shaft 17 is rotatably mounted to the crank handle plate 15 and arranged spaced from and parallel to the handle axle 16. To complete the housing 11, the housing is provided with an unlabeled sidewall and a housing first floor 18 spaced from the housing top wall 14 a first spacing distance therefrom, with a housing second floor 19 spaced from the housing top wall a second spacing distance which is less than the first spacing. A beveled floor interface 20 connects the first floor 18 to the second floor 19. A flexible insulative polymeric hose 12 is mounted to the side wall of the housing and extends therefrom. The hose 12 includes a hose head 13 mounted to a distal end of the hose spaced from the housing 11. Suction cup feet 35 extend from the floor below the housing to secure and maintain the housing structure in a desired orientation relative to an underlying support surface.

Figure 4:
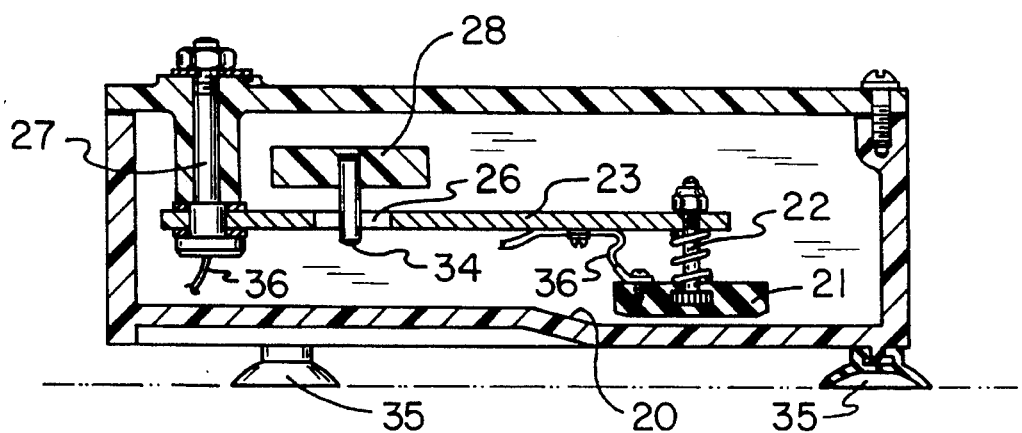
FIG. 4 is a further cross sectional view, taken along the lines 4—4 of FIG. 2 in the direction indicated by the arrows.

Referring to FIG. 4 with concurrent reference to the figures previously discussed, it can be shown that a wiper plate electrode 21, typically formed of ceramic material or other such suitable material capable of generating static electricity relative to the floor structure, is rotatably mounted to a pivot plate 23 about a wiper plate support shaft 22, with a support shaft spring 24 interposed between the pivot the wiper plate electrode 21 to bias the wiper plate electrode in a spaced orientation relative to the pivot plate 23. During operation, the wiper plate electrode 21 is directed from a first position overlying the first floor 18 to a second position in engagement with the second floor 19 to generate static electricity by rubbing of the wiper plate electrode over the second floor.

As shown in FIG. 2, a pivot plate return spring 25 is directed from the pivot plate 23 within a side wall structure of the housing 12 to bias the wiper plate electrode 21 to the first position over the first floor 18. The pivot plate 23 is mounted about a pivot plate axle 27 extending orthogonally through the housing top wall 14, as indicated in FIG. 4 for example. The pivot plate 23 further includes a pivot plate slot 26 receiving a guide rod 34 therethrough that effects the oscillation of the pivot plate over the second floor from the first floor.

To direct this oscillation, a driven gear 28 is mounted about a driven gear axle 33 that is directed through the top wall 14 parallel to the pivot plate axle 27 and parallel the handle axle 16. The driven gear 28 is provided with driven gear teeth 29 arranged continuously about the periphery of the driven gear, with the guide rod 34 being fixedly and orthogonally mounted to the driven gear 28 but parallel and offset relative to the driven gear axle 33. A drive gear 30 is fixedly mounted to the handle axle 16 within the housing, having drive gear teeth 31 that are discontinuous defining a gap 32 of an arcuate length at least equal to or preferably greater than a plurality of the drive gear teeth 31. The gap 32 is operable to permit disengagement of the driven gear 28 relative to the drive gear and allow a return of the pivot plate 23 to the first position, as illustrated in FIG. 2 in solid line, over the first floor relative to a second position of the pivot plate positioned in engagement with the second floor 19, as illustrated in phantom in FIG. 2. Such oscillations across the floors 18, 19 generate a voltage potential or static electricity through the known process of triboelectric charging.

Figure 5:
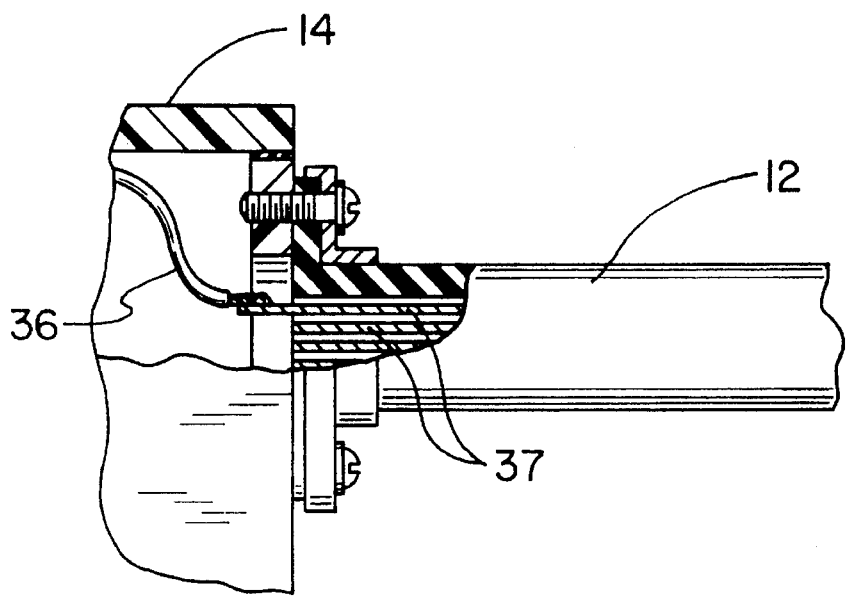
FIG. 5 is an orthographic view, partially cut away, of the flexible hose connection relative to the housing structure.
Figure 6:
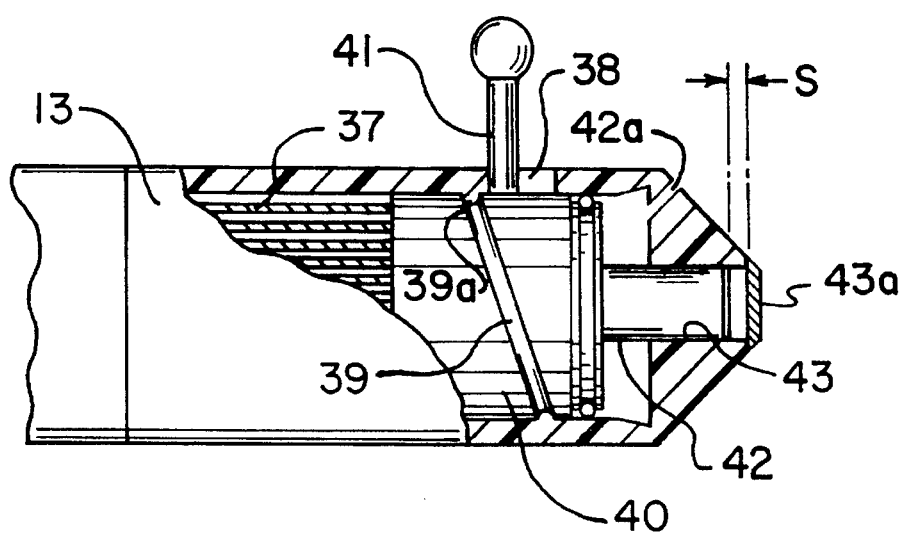
FIG. 6 is an orthographic view, partially broken away, of the head portion of the hose structure.

A conductor cable 36 is directed to the wiper plate electrode 21 through the pivot plate 23 and extends to resilient, extensible conductor wires 37 directed through the hose 12, in a manner as indicated in FIG. 5. The extensible wires 37 continue to the hose head 13, wherein a metallic core 40 is coaxially aligned therewith and movably mounted therewithin. The metallic core 40 includes a helical groove 39 cooperative with a groove projection 39a extending within the hose head 13. A core handle 41 fixedly mounted to the metallic core 40 extends through a helical slot 38 within the hose head 13, such that a pivoting of the core handle 41 effects displacement of the metallic core 40 within the hose head 13. A conductor core rod 42 is fixedly and coaxially mounted to the metallic core 40 and arranged to project within a head aperture 43 within a forward most distal end of the hose head 13, with the head aperture terminating in a head aperture wall 43a which precludes an introduction of objects within the head aperture. In this manner, a spacing "S" provides for a sufficient build-up of static electricity through the resilient conductor wires 37 which may be utilized to attract objects while simultaneously precluding contact with the object which would result in a release of the electric charge. The adjustable capability provided to the metallic core 40 and its associated conductor core rod 42 allows the spacing "S" to be adjusted to accommodate various objects. Note further, the vent 42a is provided to help relieve any air pressure differences generated as a result of the movement of the metallic core 40 within the hose head 13.

Further, to prevent excessive build-up of static electricity within the housing 11 reference is made to FIG. 3, wherein a first electrode 45 fixedly mounted to the second floor 19 includes a first electrode discharge leg 46 extending in electric communication with the first electrode 45 exteriorly of the housing to engage an underlying support surface, as the discharge leg 46 extends from the second floor below the housing. A second electrode 47 mounted to a second electrode shaft 48 includes a screw adjuster 49 threadedly directed through the second floor 19 in engagement with the second electrode shaft 48 to effect spaced adjustment of the first electrode 45 relative to the second electrode 47 by displacement of the screw adjuster 49 in its engagement with the second electrode shaft 48.

Figure 9:
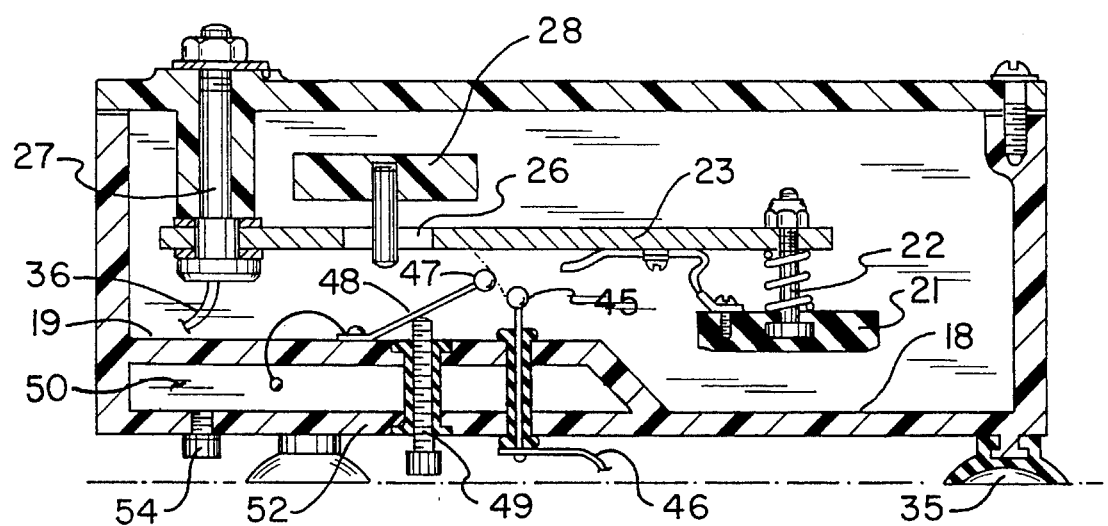
FIG. 9 is a further cross sectional view of the invention illustrating the housing including a storage compartment.

With reference to FIG. 9, it can be shown that the housing 11 may include a storage compartment 50 wherein an extended first floor 52 is spaced from the second floor 19 to define the storage space 50 whereby static electricity is stored within the space. The space 50 communicates with the second electrode shaft 48 by a small unlabeled wire which projects through the second floor 19, and insulators are provided to insulate both the screw adjuster 49 and the first electrode 45. The storage space 50 provides for greater storage of static electricity, thereby resulting in increased holding strength and longer holding durations of the attracted objects. A vent means 54 is provided for selectively venting air and/or static electricity from the storage space 50 as desired.

Figure 7:
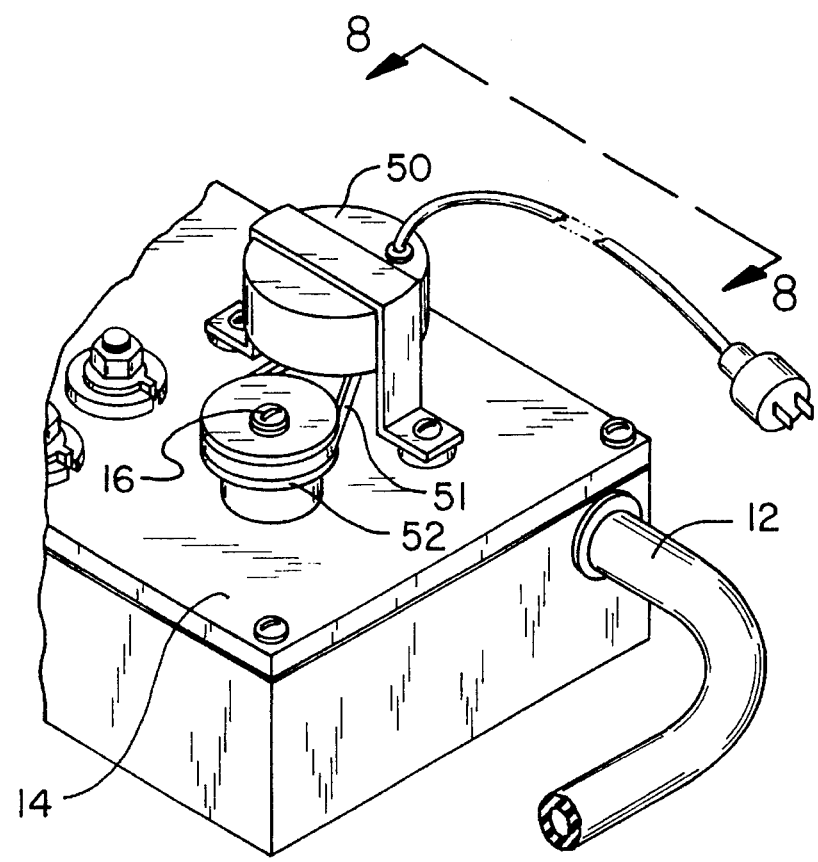
FIG. 7 is an isometric illustration of the invention employing electric drive motor structure.
Figure 8:
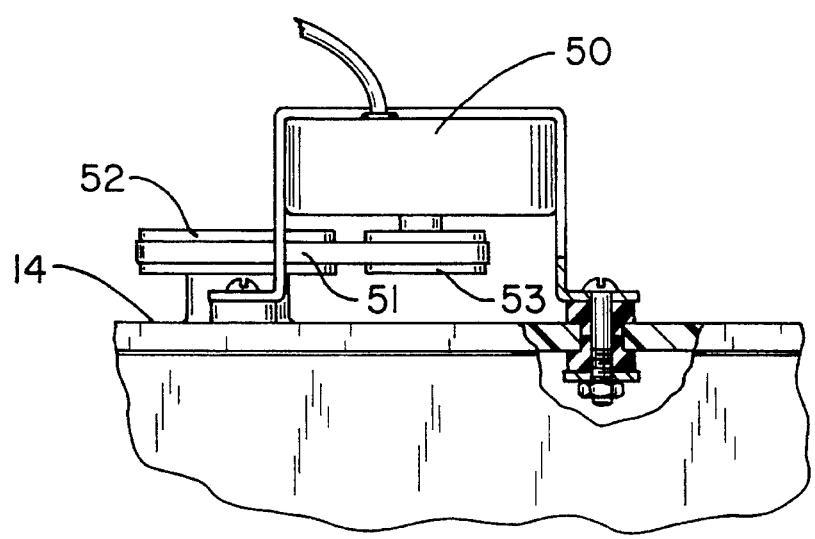
FIG. 8 is an enlarged orthographic view, taken along the lines 8—8 of FIG. 7 in the direction indicated by the arrows.

Alternatively, in lieu of rotation of the crank, a drive motor 50 may be provided, as illustrated in FIGS. 7 and 8, having a drive motor pulley 53 with an output belt 51 extending from the drive motor pulley 53 to a handle axle pulley 52 fixedly mounted to the handle axle 16. The drive motor may of course be of AC or DC configuration or may be switched to provide AC or DC usage as required.

Further, it should be noted that the wiper plate electrode 21 may in fact be provided with various metallic inserts and the pad itself may be formed of any suitable material permitting static charge development. The housing itself is typically formed of a non-conductive material providing for electrically insulating the charge within the housing structure. To this end, the gearing as well as all other materials may be configured to prevent charge leakage through the housing, as required, but if the housing should be electrically conductive, it should be understood that insulative materials would be employed to prevent leakage of charge from within the housing exteriorly of the housing, with the exception of the utilization of the static discharge structures 45 and 47 described above and the use of the hose structure 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as defined only by the claims annexed hereto.

What is claimed as being new and desired to be protected by Letters Patent of the United States is as follows:

1. An electrostatic generator apparatus comprising:
   a housing having a housing top wall and a housing side wall;
   a flexible insulative hose extending from the side wall exteriorly of the housing, with the hose terminating in a hose head;
   electrostatic generator means mounted within the housing for generating electrostatic electricity through the hose and the hose head;
   a handle axle rotatably mounted through the housing top wall and in operative communication with the electrostatic generator means for actuating the electrostatic generator means to producing the electrostatic electricity; and,
   conductor means for conducting the electrostatic electricity through the flexible insulative hose, such that an object may be attracted by the electrostatic electricity to the hose head for retrieval of the object,
   wherein the housing includes a housing first floor and a housing second floor, with the housing first floor spaced a predetermined spacing from said housing top wall, and said housing second floor spaced a predetermined second spacing from said housing top wall, wherein said predetermined second spacing is less than said predetermined spacing, and further wherein the electrostatic generator means includes a drive gear mounted within the housing and fixedly secured to the handle axle; drive means mounted to the handle axle for effecting rotation of the handle axle; a driven gear in operative communication with the drive gear mounted within the housing, wherein the driven gear includes a driven gear axle mounted through the housing top wall parallel to said handle axle; a pivot plate having a pivot plate first end, a pivot plate second end, and a pivot plate slot, the pivot plate being mounted for oscillation within the housing; a pivot plate axle mounted to the pivot plate first end and extending through the top wall parallel to said handle axle and said driven gear axle; a wiper plate electrode support shaft mounted to the pivot plate second end and extending orthogonally therethrough; a wiper plate electrode mounted to the wiper plate electrode support shaft spaced from the pivot plate, a guide rod fixedly and orthogonally mounted to the driven gear spaced from the driven gear axle, the guide rod being positioned within the pivot plate slot, whereupon rotation of the driven gear by said gear effects displacement of said guide rod and oscillation of the wiper plate electrode, between a first position over said housing first floor and slidably over the housing second floor to a second position, thereby generating electrostatic electricity by triboelectric charging.

2. An apparatus as set forth in claim 1, and further comprising a return spring mounted to said pivot plate, said return spring being mounted within said housing to return said pivot plate to said first position from said second position, and wherein the driven gear includes a continuous annular array of driven gear teeth, with the drive gear including a discontinuous annular array of drive gear teeth, said drive gear teeth including a gap equal to at least a plurality of said drive gear teeth, thereby permitting intermittent disengagement of said drive gear from said driven gear and permitting return of said wiper plate electrode from said second position to said first position.

3. An apparatus as set forth in claim 2, wherein the conductor means comprises a conductor cable extending from electrical communication with said wiper plate electrode through said pivot plate to said hose and at least one conductor wire in electrical communication with said conductor cable, wherein said conductor wire extends through said hose to said hose head, said hose head including a head aperture directed thereinto, and further comprising a metallic core movably mounted within said hose head and having a conductor core rod fixedly secured thereto, and adjustor means within said hose head for permitting selective displacement of said conductor core rod within said head aperture.

4. An apparatus as set forth in claim 3 wherein, said adjuster means includes a helical slot directed through said hose head, with said metallic core including a core handle fixedly mounted to said metallic core extending through said helical slot, and said metallic core having a helical groove, and said hose head having a groove projection received within said helical groove, whereupon displacement of said core handle within said helical slot rotates said metallic core relative to said hose head and provides relative movement of said groove projection upon said helical groove to effect axial movement of said metallic core.

5. An apparatus as set forth in claim 4, wherein said second floor includes a first electrode fixedly mounted to said second floor extending therethrough, with said first electrode having a discharge leg in electrical communication with said first electrode extending in a spaced relationship relative to said second floor and beyond said housing, wherein the second floor further includes a second electrode positioned in adjacency to said first electrode, wherein said second electrode includes a second electrode shaft, said second electrode shaft being fixedly mounted to said second floor spaced from said first electrode, with a screw adjuster threadedly directed through said second floor in engagement with said second shaft, whereupon displacement of said screw adjuster relative to the second floor effects adjustment of said second electrode relative to said first electrode, wherein said second electrode shaft is spring biased to said second floor in engagement with said screw adjuster.

6. An electrostatic generator apparatus comprising:

a housing having a housing top wall, a housing floor, and a housing side wall;

a flexible insulative hose extending from the side wall exteriorly of the housing, with the hose terminating in a hose head;

electrostatic generator means mounted within the housing for generating electrostatic electricity through the hose and the hose head;

a handle axle rotatably mounted through the housing top wall and in operative communication with the electrostatic generator means for actuating the electrostatic generator means to producing the electrostatic electricity; and, conductor means for conducting the electrostatic electricity through the flexible insulative hose, such that an object may be attracted by the electrostatic electricity to the hose head for retrieval of the object, wherein the electrostatic generator means includes a drive gear mounted within the housing and fixedly secured to the handle axle; drive means mounted to the handle axle for effecting rotation of the handle axle; a driven gear in operative communication with the drive gear mounted within the housing, wherein the driven gear includes a driven gear axle mounted through the housing top wall parallel to said handle axle; a pivot plate having a pivot plate first end, a pivot plate second end, and a pivot plate slot, the pivot plate being mounted for oscillation within the housing; a pivot plate axle mounted to the pivot plate first end and extending through the top wall parallel to said handle axle and said driven gear axle; a wiper plate electrode support shaft mounted to the pivot plate second end and extending orthogonally therethrough; a wiper plate electrode mounted to the wiper plate electrode support shaft spaced from the pivot plate, a guide rod fixedly and orthogonally mounted to the driven gear spaced from the driven gear axle, the guide rod being positioned within the pivot plate slot, whereupon rotation of the driven gear by said gear effects displacement of said guide rod and oscillation of the wiper plate electrode slidably over the housing floor between a first position and a second position, thereby generating electrostatic electricity by triboelectric charging.

7. An apparatus as set forth in claim 6, and further comprising a return spring mounted to said pivot plate, said return spring being mounted within said housing to return said pivot plate to said first position from said second position, and wherein the driven gear includes a continuous annular array of driven gear teeth, with the drive gear including a discontinuous annular array of drive gear teeth, said drive gear teeth including a gap equal to at least a plurality of said drive gear teeth, thereby permitting intermittent disengagement of said drive gear from said driven gear and permitting return of said wiper plate electrode from said second position to said first position.

8. An apparatus as set forth in claim 7, wherein the conductor means comprises a conductor cable extending from electrical communication with said wiper plate electrode through said pivot plate to said hose and at least one conductor wire in electrical communication with said conductor cable, wherein said conductor wire extends through said hose to said hose head, said hose head including a head aperture directed thereinto, and further comprising a metallic core movably mounted within said hose head and having a conductor core rod fixedly secured thereto, and adjustor means within said hose head for permitting selective displacement of said conductor core rod within said head aperture.

9. An apparatus as set forth in claim 8, wherein said adjuster means includes a helical slot directed through said hose head, with said metallic core including a core handle fixedly mounted to said metallic core extending through said helical slot, and said metallic core having a helical groove, and said hose head having a groove projection received within said helical groove, whereupon displacement of said core handle within said helical slot rotates said metallic core relative to said hose head and provides relative movement of said groove projection upon said helical groove to effect axial movement of said metallic core.

10. An apparatus as set forth in claim 9, wherein said drive means includes a drive motor mounted to the top wall, said drive motor including a drive motor pulley, and said handle axle including a handle axle pulley, with an output belt extending between said handle axle pulley and said drive motor pulley to effect rotation of said handle axle.

11. An apparatus as set forth in claim 10, and further including a support shaft spring positioned between said pivot plate and said wiper plate electrode to bias said wiper plate electrode in a spaced orientation relative to said pivot plate.

12. An electrostatic generator apparatus comprising:

a housing having a housing top wall, a housing floor, and a housing side wall;

electrostatic generator means mounted within the housing for generating electrostatic electricity;

conductor means for conducting the electrostatic electricity from the housing, such that an object can be attracted by the electrostatic electricity for retrieval of the object, wherein the electrostatic generator means includes a pivot plate having a pivot plate first end, a pivot plate second end, and a pivot plate slot, the pivot plate being mounted for oscillation within the housing; a pivot plate axle mounted to the pivot plate first end and extending through the top wall; a wiper plate electrode mounted to the pivot plate second end; and means for effecting oscillation of the pivot plate so as to oscillate the wiper plate electrode slidably over the housing floor between a first position and a second position, thereby generating electrostatic electricity by triboelectric charging.

13. An apparatus as set forth in claim 12, and further comprising a return spring mounted to said pivot plate, said return spring being mounted within said housing to return said pivot plate to said first position from said second position.

14. An apparatus as set forth in claim 13, wherein the conductor means comprises a conductor cable extending from electrical communication with said wiper plate electrode through said pivot plate; and at least one conductor wire in electrical communication with said conductor cable, wherein said conductor wire extends exteriorly of said housing.

* * * * *